Dec. 12, 1950     C. B. V. NEILSON ET AL     2,533,607
TORQUE EQUALIZING MEANS FOR AIRCRAFT
LANDING GEAR BRAKES

Filed Aug. 30, 1948     4 Sheets-Sheet 1

Inventors:
Christopher Bernard Vere Neilson
and Robert George Hoare;
By their attorneys,
Baldwin, Wight, & Prevost

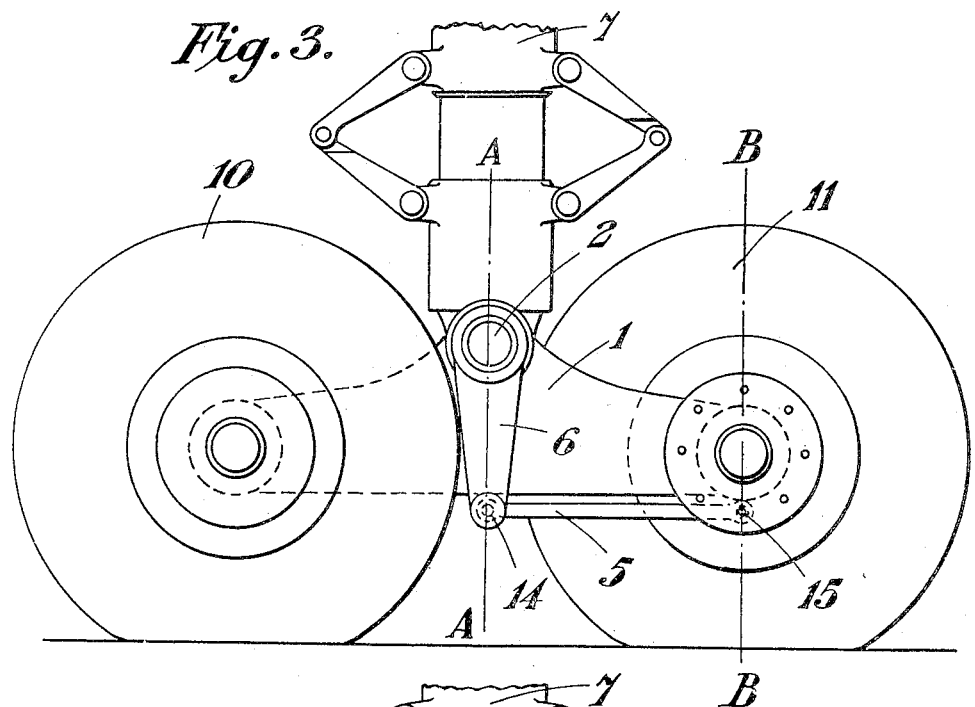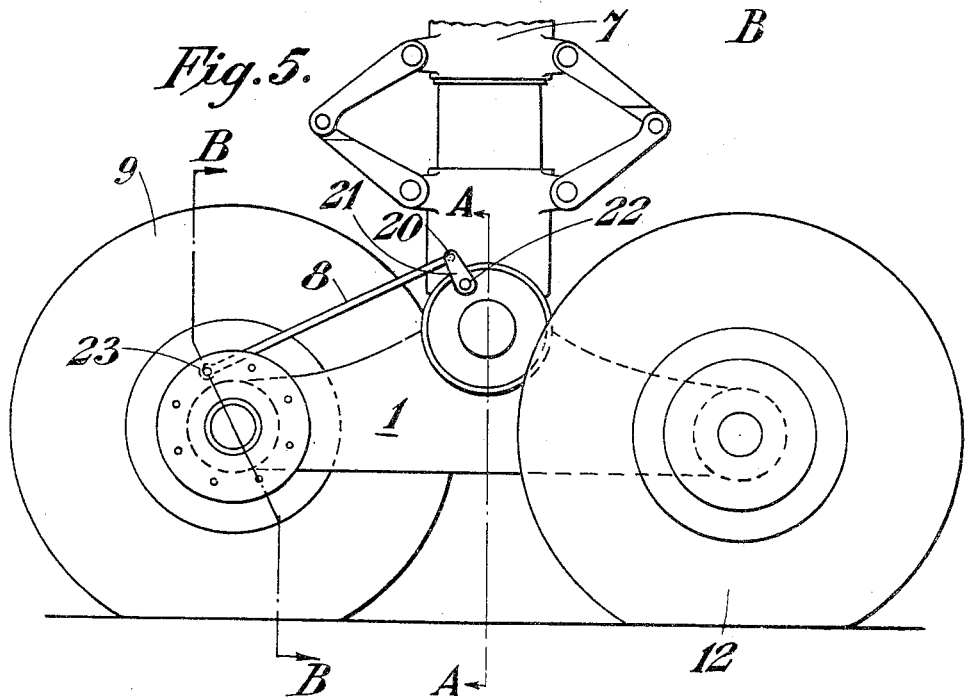

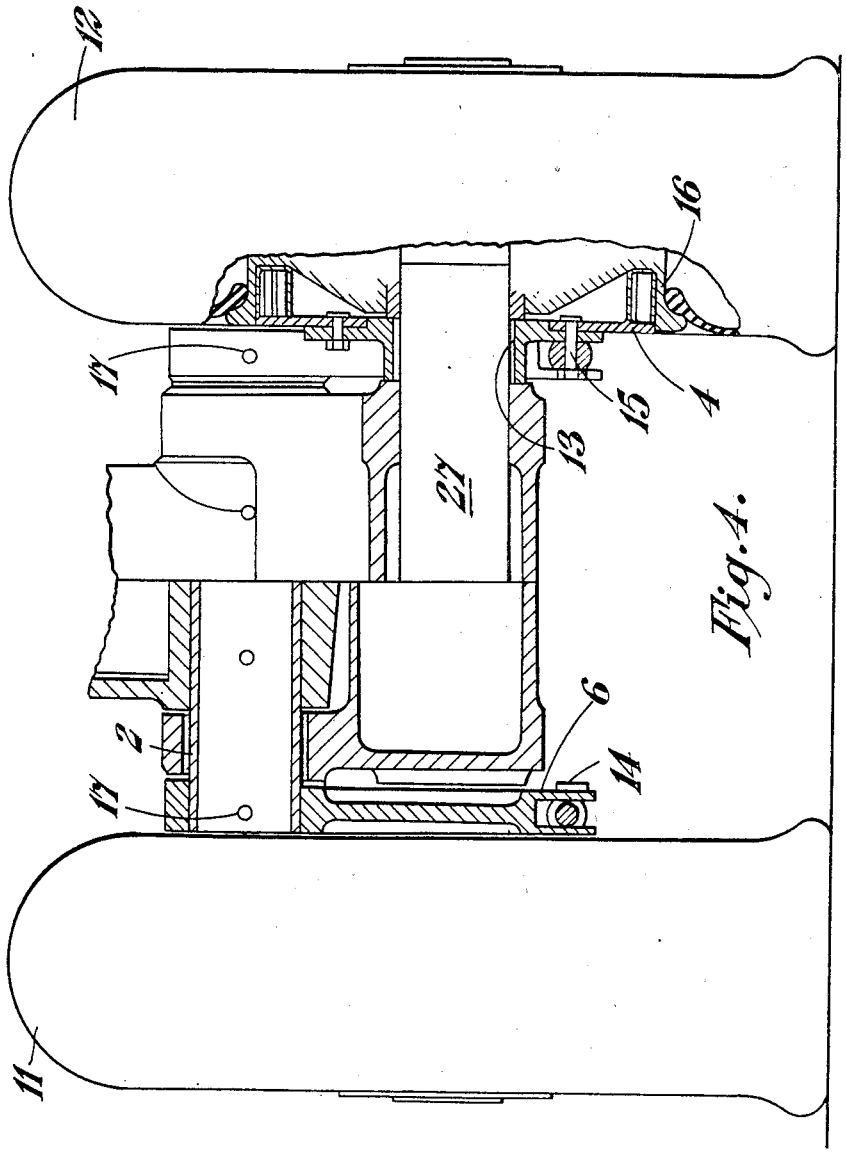

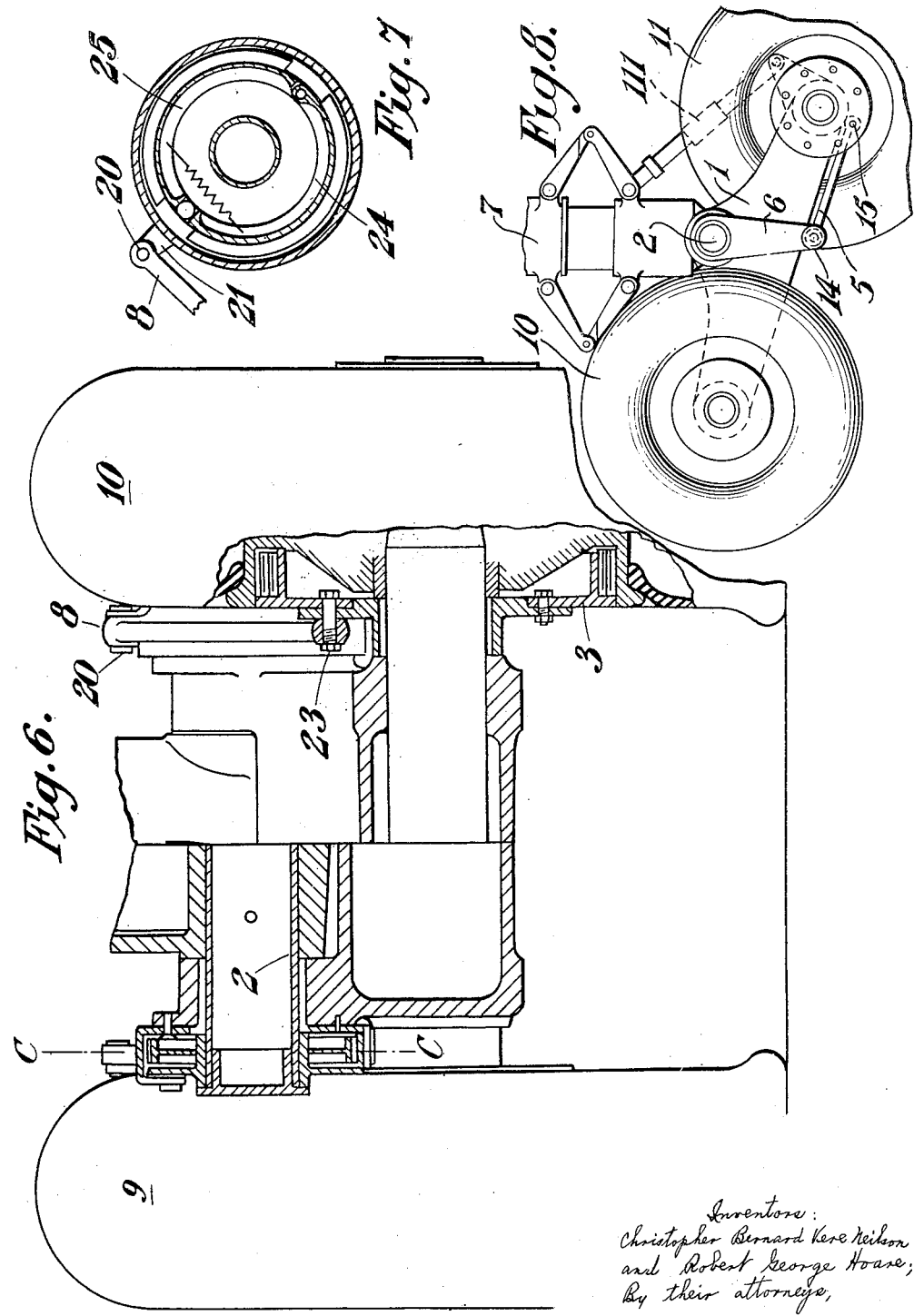

Patented Dec. 12, 1950

2,533,607

UNITED STATES PATENT OFFICE 2,533,607

TORQUE EQUALIZING MEANS FOR AIRCRAFT LANDING GEAR BRAKES

Christopher Bernard Vere Neilson, Eagle Brow, Lym, and Robert George Hoare, Warrington, England, assignors to Electro-Hydraulics Limited, Warrington, England, a company of Great Britain Application August 30, 1948, Serial No. 46,784
In Great Britain June 5, 1947

5 Claims. (Cl. 244—111)

This invention relates to aircraft landing gear.

It is known to mount the landing wheels of aircraft on bogie frames or endless tracks or to mount two wheels in tandem: there known arrangements of mounting the wheels call into play certain undesirable characteristics, for examples when a braking action is applied between the wheel axles and the wheels, the resultant drag at ground level tends to tip the frame or track so that the rear wheels leave the ground.

It is one of the objects of this invention to provide an arrangement in which the tipping of landing wheels mounted in bogie frames, endless tracks or the like, when a braking action is applied, is nullified and to maintain a uniform distribution of the vertical loads on the wheels; another object is to provide means for facilitating the use of a frame or bogie when the aircraft is turning in a tight turn.

According to the present invention, landing gear for aircraft comprises a plurality of landing wheels mounted on a frame member, such as a frame, bogie or endless track, said member being pivoted about a horizontal axis, and means adapted to apply to the frame member a force proportional to the tilting torque or moment on the said frame member produced by the braking force between the wheels and the ground, said means being simultaneously actuated when braking force is applied between the brake shoes and brake drums of the landing wheels.

The said means may be actuated by the braking force transmitted between the brake shoes and brake drums or may comprise a separately actuated brake provided on the frame member at its point of pivotal attachment to the normal wheel axle.

In order to allow the aircraft readily to turn in a tight turn, the front or rear wheels on the frame members are so formed that they can castor.

Figure 1:
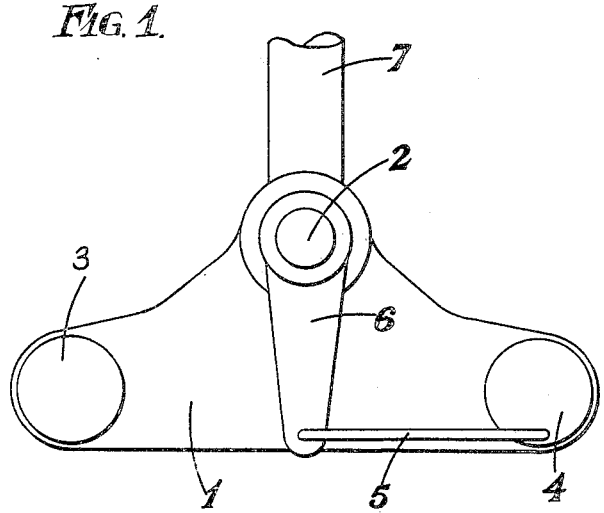

Two forms of the invention are illustrated in the accompanying drawings in which Figure 1 shows diagrammatically a form in which the means, for applying a force to the frame member, is actuated by the braking force transmitted between the brake shoes and brake drums, and Figure 2 shows again diagrammatically the alternative form including a separately actuated brake.

Figure 2:
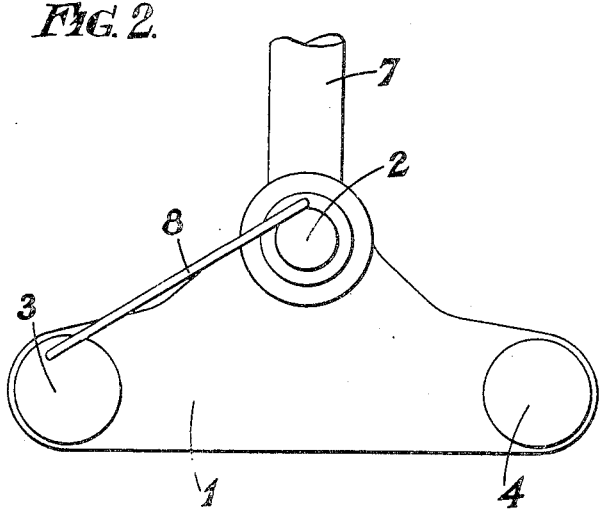

Figures 3 and 4 show one embodiment of the construction according to Figure 1 in side elevation and half section views respectively, Figure 4 showing sections on the lines A—A, B—B, Figure 3, whilst Figures 5 and 6 are views similar to Figures 3 and 4 but of the construction according to Figure 2, Figure 7 being a detail sectional view on the line C—C of Figure 6. Figures 4 and 6 are shown to an enlarged scale. Figure 8 is an elevational view showing a construction similar to that shown in Figures 3 and 4 but including additionally a hydraulic jack for tilting a bogie or undercarriage frame.

Referring to Figure 1 in place of each normally provided landing wheel of aircraft there are provided four landing wheels, mounted in a bogie frame member 1 which is carried from the normal wheel axle 2 and which is free to rotate thereabout. The brake back plates 3, that is to say the members carrying the shoes of the front pair of wheels, are connected to the bogie 1 in such a manner that they cannot move relative thereto. The brake back plates 4 of the rear pair of wheels are fitted on bearings and are rotated relative to the bogie 1. The said rear brake back plates are coupled by a link 5 which is pinjointed at its ends to an arm or lever 6 which is fixed on the axle 2 of the bogie and cannot move relative thereto. The main suspension leg of the undercarriage is shown at 7.

Referring to Figures 3 and 4, pivotally connected to the leg 7 by the axle 2 is the bogie frame 1 carrying four wheels. The back brake plates of the front wheels 10 are connected to the bogie 1 in such a manner that they cannot move relative thereto. The brake back plates 4 of the rear pair of wheels are fitted on a bearing 13 surrounding the axle or axles 27 carrying the rear wheels 11 and 12 and are thus rotated relative to the bogies and the brake drum 16 of the wheels. The rear brake back plates 4 are coupled by pins 15 to the links 5 which are pinjointed by pins 14 at their ends to the arms or levers 6, which in turn are fixed by the dowels 17 to the main axle 2 of the bogie and cannot move relative thereto.

It will be appreciated that in the above arrangement the brake torque on the rear brake back plates 4 transmitted through the brake shoes will apply tension in the link 5 for one direction of movement of the aircraft, that is to say travel from right to left as shown, and since this link 5 is coupled to the arm 6 fast with the axle 2 the link provides the necessary reaction to balance the tilting torque moment on the bogie frame member 1. If the movement of the aircraft is in the opposite direction, that is to say from left to right as shown the rear brake back plates 4 will apply compression in the link 5 and thereby tend to reduce the vertical load on the rear wheels, thus maintaining the ground pressure uniform. For any known rolling radius of the tyres of the wheels the distance between the wheel axles and the point of coupling the link 5 to the rear brake back plates 4 can be so selected that on applying the brakes, the loads on the member 1 give no moment about the axle 2 and thus the bogie frame member 1 does not tend to tilt. It will of course be apparent that in an alternative arrangement the rear brake back plates may be fixed and the front wheel brake back plates be similarly connected to the arm or lever 6.

Referring now to Figure 2 similar parts have been given the same references as those in Figure 1. In this arrangement the rear wheel brake back plates, i. e. the members carrying the shoes of the pairs of rear wheels are connected to the bogie frame member 1 in such a manner that they cannot move relative thereto. The front brake back plates 3 are free to move relative to the bogie frame member 1, but are coupled by a link or tie rod 8 which is pin-jointed at its ends to a frame brake provided at the pivotal attachment thereof to the normal wheel axle 2.

Referring more particularly to Figures 5, 6 and 7 the front brake back plates 3 are mounted on bearings surrounding the axles of the front wheels 9, 10, and are free to move relatively to the bogie 1 but are coupled by pins 23 to the link or tie-rod 8 which is pin-jointed at its end by pin 20 to a lever 21 fixed to the brake shoes 24, 25 (see Figure 7), allowing a braking force to be applied to the main bogie axle.

When means are provided to apply fluid pressure in a known way to the brake shoes 24 and 25, directly, this pressure can be utilised to lock the bogie frame in any desired position in relation to the leg.

It will be appreciated that the frame brake is operated by a force transmitted through the application of the wheel brakes. Again by applying fluid pressure in a known way to the front brake back plates and similarly to the frame brake, this latter can compensate for the tilting action so that the frame brakes would be in proportion to the tilting action of the wheel brakes. If, however, fluid pressure is applied only to the wheel brake the link or tie rod 8 will transmit the braking force to the frame brake back plates. It will, of course, again be apparent that if the lik or tie rod 8 is dispensed with the brake back plates of both the front and rear wheels should be connected to the bogie frame member in such a manner that they cannot move relative thereto and at the point of pivotal attachment of the frame to the normal wheel axle an independent brake may be provided which may be either simultaneously or at will actuated when braking force is applied to the normal wheel brakes, the frame brake substantially balancing the tilting torque or moment on the frame produced by the braking force between the wheels and the ground. This frame brake thus compensates for the tilting action so that the frame brakes would be in proportion to the tilting action of the wheel brakes.

In order to provide for the necessary action of the bogie frames when the aircraft is turning in a tight turn it has been stated above that means are provided to facilitate such use. With conventional undercarriages in such cases it is commonly the practice to lock one wheel completely and pivot on it, and it is frequently a requirement that the aircraft should be able to turn about one main undercarriage. In the case of a bogie with four wheels on the ground, none of which are castoring, such turning could only be effected by scraping two of the wheels sideways with some danger of tearing the tyres off the rims. In order to obviate the above danger means such as an hydraulic jack or other actuating device may be provided to raise either the front pair of wheels or the rear pair of wheels from the ground. A representative embodiment of such a construction is shown in Figure 8 as being similar to the construction illustrated in Figures 3 and 4, but including additionally a hydraulic jack 111 connected between the bogie or frame 1 and the undercarriage leg 7. In such cases the damage to tyres when pivoting on the undercarriage is minimised if only one of the wheels remaining on the ground is locked by brakes.

What we claim is:

1. In landing gear for an aircraft having an undercarriage leg, a frame pivoted on said leg to rock about an axis transverse to the direction of travel of the aircraft; load-supporting wheels mounted on said frame; wheel brake mechanism including cooperating wheel-carried and frame-carried brake elements for applying wheel-braking force with consequent creation of a moment tending to tilt said frame about said transverse axis; and normally ineffective torque-producing means, actuatable when wheel-braking force is applied, for applying to said frame a force proportional and in opposition to said moment thereby to counteract said tendency of said frame to tilt.

2. In landing gear for an aircraft having an undercarriage leg, a frame pivoted on said leg to rock about an axis transverse to the direction of travel of the aircraft; load-supporting wheels mounted on said frame; wheel brake mechanism including cooperating wheel-carried and frame-carried brake elements for applying wheel-braking force with consequent creation of a moment tending to tilt said frame about said transverse axis; a separate and normally ineffective brake mechanism including cooperating elements carried on said frame and said leg respectively; and means actuatable when wheel-braking force is applied for applying said separate brake mechanism and rendering it effective in proportion and in opposition to said moment to counteract the tendency of said frame to tilt.

3. In landing gear for an aircraft having an undercarriage leg, a frame pivoted on said leg to rock about an axis transverse to the direction of travel of the aircraft; load-supporting wheels mounted on said frame; wheel brake mechanism including cooperating wheel-carried and frame-carried brake elements for applying wheel-braking force with consequent creation of a moment tending to tilt said frame about said transverse axis; a separate and normally ineffective brake including cooperating elements carried on said frame and said leg respectively; normally ineffective actuating means adapted when rendered effective to apply said separate brake; and means for rendering said actuating means effective simultaneously with application of said wheel brake mechanism to thereby render said separate brake effective in proportion and in opposition to said moment to counteract the tendency of said frame to tilt.

4. In landing gear for an aircraft having an undercarriage leg, a frame pivoted on said leg to rock about an axis transverse to the direction of travel of the aircraft; load-supporting wheels mounted on said frame; wheel brake mechanism including cooperating wheel-carried and frame-carried brake elements for applying wheel-braking force with consequent creation of a moment tending to tilt said frame about said transverse axis; and normally ineffective torque-producing means, actuatable when wheel-braking force is applied, for applying to said frame a force proportional and in opposition to said moment thereby to counteract said tendency of said frame to tilt, one of the elements of said wheel brake mechanism, namely, a frame-carried element, being mounted to turn on said frame, and said torque-producing means including a mechanical connection between said turntable frame-carried wheel brake element and said leg.

5. In landing gear for an aircraft having an undercarriage leg, a frame pivoted on said leg to rock about an axis transverse to the direction of travel of the aircraft; load-supporting wheels mounted on said frame; wheel brake mechanism including cooperating wheel-carried and frame-carried brake elements for applying wheel-braking force with consequent creation of a moment tending to tilt said frame about said transverse axis, one of said wheel brake elements, namely, a frame-carried element, being mounted to turn on said frame; a separate and normally ineffective brake mechanism including cooperating elements carried on said frame and said leg respectively at the pivotal mounting of said frame; and a mechanical connection including a link between said turnable frame-carried brake element and said separate brake mechanism for responding to the turning of said turnable wheel brake element incident to actuation of said wheel brake mechanism to apply said separate brake mechanism to thereby apply to said frame a torque proportional and in opposition to said moment for counteracting said tendency of said frame to tilt.

CHRISTOPHER BERNARD VERE NEILSON.
ROBERT GEORGE HOARE.

REFERENCES CITED

The following references are of record in the file of this patent:

UNITED STATES PATENTS

| Number | Name | Date |
| --- | --- | --- |
| 1,238,105 | Church | Aug. 28, 1917 |
| 2,072,787 | Anderson | Mar. 2, 1937 |
| 2,176,172 | Flowers | Oct. 17, 1939 |
| 2,403,833 | Spangler | July 9, 1946 |

FOREIGN PATENTS

| Number | Country | Date |
| --- | --- | --- |
| 504,051 | Germany | Aug. 1, 1930 |
| 708,188 | France | Apr. 27, 1931 |